United States Patent [19]

Martin et al.

[11] 4,255,397

[45] Mar. 10, 1981

[54] PROCESS FOR REMOVING TUNGSTEN FROM CEMENTED TUNGSTEN CARBIDE

[75] Inventors: Brice E. Martin; Joseph E. Ritsko; Howard L. Acla, all of Towanda, Pa.

[73] Assignee: GTE Products Corporation, Stamford, Conn.

[21] Appl. No.: 106,183

[22] Filed: Dec. 21, 1979

[51] Int. Cl.$^3$ .............................................. C01G 41/00
[52] U.S. Cl. ........................................ 423/61; 423/55; 423/53
[58] Field of Search ..................... 423/53, 55, 58, 61

[56] References Cited

U.S. PATENT DOCUMENTS

| | | | |
|---|---|---|---|
| 3,800,025 | 3/1974 | Fox | 423/61 |
| 3,887,680 | 6/1975 | MacInnis et al. | 423/55 |

FOREIGN PATENT DOCUMENTS 227521  4/1960  Australia ..................... 423/61

*Primary Examiner*—Herbert T. Carter
*Attorney, Agent, or Firm*—Robert E. Walter

[57] ABSTRACT

In a process for recovering tungsten from cemented tungsten carbide, the tungsten carbide is oxidized to form an oxidized product and the oxidized product is digested in an aqueous solution of alkali metal hydroxide to form a soluble portion containing tungsten values and an insoluble residue portion. According to the improved process of the present invention, tungsten values are recovered from the insoluble residue portion by mixing the insoluble portion with an alkali metal carbonate to form a resulting mixture, roasting the resulting mixture in an atmosphere containing oxygen to oxidize the insoluble portion and form another product which is leached with water to recover soluble tungsten values.

5 Claims, No Drawings

PROCESS FOR REMOVING TUNGSTEN FROM CEMENTED TUNGSTEN CARBIDE

BACKGROUND OF THE INVENTION

This invention relates to the recovery of tungsten values from scrap cemented tungsten carbide. More particularly, it relates to a improved process for recovering tungsten from the oxidation product of a cemented tungsten carbide.

Recovery of tungsten values from scrap tungsten carbide has been a problem in the carbide industry for a number of years. Cemented carbide tools are made by consolidating extremely hard and fine metal carbide particles together with a suitable binder or cement. Typically, such tools contain tungsten carbide cemented with cobalt although additional carbides such as the carbides of titanium, vanadium, chromium or molybdenum may also be present.

Cobalt is the most widely used cementing material although other cementing materials such as iron, nickel, chromium or molybdenum may be employed. Since all of the materials used in the cemented carbides are extremely valuable, it is desirable to reclaim the materials found therein.

Various processes have been used in the past with varying degrees of success. U.S. Pat. No. 3,953,194 to Hartline et al describes a process for reclaiming cemented metal carbide material by subjecting the metal carbide material to catastrophic oxidation to produce a mixture of metal oxide and the oxide of the cement. The resulting oxide is reduced and finally carbonized.

Another process described in U.S. Pat. No. 3,887,680 to MacInnis, Vanderpool and Boyer wherein tungsten carbide containing an iron group metal such as cobalt is oxidized from a friable oxidation product. The oxidation product is then ground and treated by digesting it in an aqueous solution of alkali metal hydroxide under controlled conditions to recover tungsten values.

U.S. patent application Ser. No. 827,745 entitled Oxidation of Tungsten Carbide, filed Aug. 25, 1977, to Vanderpool et al relates to a process wherein cemented tungsten carbide pieces are heated to a red glow in an enriched atmosphere of oxygen to result in a self-sustaining reaction whereby the pieces continue to oxidize after removal of heat.

U.S. Pat. No. 3,256,058 to Burwell describes a process wherein tungsten is recovered from wolframite or scheelite by fusing the ore at a temperature in excess of 698° C. with a fusion mixture containing sodium carbonate, sodium chloride and sodium nitrate in a specific proportion.

Oxidation of cemented tungsten carbide by heating an oxygen containing atmosphere has proven to be a beneficial process. The present invention is directed to an improvement of this process.

SUMMARY OF THE INVENTION

According to prior art processes, such as described in U.S. Pat. No. 3,887,680 to MacInnis et al, oxidation of cemented tungsten carbide can result in very high yields of the total tungsten contain in the cemented carbide by subjecting the cemented tungsten carbide to oxidation for a relatively long period of time.

It is an object of the present invention to obtain substantially high yields of tungsten values while using substantially shorter oxidation times than heretofore used to obtain substantially complete recovery of tungsten values present in the cemented tungsten carbide starting material.

In accordance with the present invention, there is provided an improvement in a process for recovering tungsten from cemented tungsten carbide wherein cemented tungsten carbide is oxidized to form an oxidized product which is digested in an aqueous solution of an alkali metal hydroxide to form a soluble portion and an insoluble portion, the improvement of the present process comprises separating the insoluble portion and mixing said insoluble portion with an alkali metal carbonate, roasting the resulting mixture in an atmosphere containing oxygen below the fusion temperature to oxidize the insoluble portion and form another product and leaching the other product with water to recover soluble tungsten values.

DETAILED DESCRIPTION OF PREFERRED EMBODIMENTS

The present invention is primarily concerned with an improvement in the basic processes described in U.S. Pat. No. 3,887,680 to MacInnis et al. According to the processes described in the above patent, scrap tungsten carbide is oxidized in air at a temperature preferably from about 825° C. to about 850° C. Although higher temperatures and lower temperatures can be used, the oxidation rate is slowed at temperatures below 825° C.

The time period of oxidation depends on the size of the particles being oxidized, but generally for particles having a cross section of from about 0.25 to about 0.5 inch, it is necessary to employ oxidation times in excess of 30 hours to obtain substantially complete oxidation of the material.

According to the process of the above patent the oxidized cemented tungsten carbide product mushrooms and forms friable product which can be easily ground to powder form. The powder is charged to an aqueous solution of an alkali metal hydroxide and is heated under pressure for a number of hours. The iron group metal tungstate that is formed is converted to a water soluble alkali metal tungstate and the iron group metal is in insoluble form thereby allowing a separation of the tungsten values from the iron group of metals. The term iron group metals as used herein refers to the binder material which is most commonly cobalt although other metals as hereinbefore mentioned can be utilized.

Although any alkali metal hydroxide can be used according to the above process, sodium hydroxide is preferred because of its availability and cost. An aqueous solution containing from about 20 to about 50 percent sodium hydroxide is further preferred. After the oxidized material is ground to a powder, it is charged to the alkali metal hydroxide at a temperature of at least about 20° C. At least the stoichiometric amount of the alkali metal hydroxide must be present to enable an alkali metal tungstate to be formed. An excess of about 50 percent of theory is preferred to ensure that all of the tungsten values are converted to a soluble tungsten form. The pressure used during digestion is generally from about 50 to 200 psig. The temperature used during digestion is generally from about 140° C. to 195° C. About 6 to 10 hours is required to convert the tungsten to a water soluble form at the foregoing temperatures and pressures. Higher pressures and higher temperatures tend to promote and shorten the time required, however, use of temperatures above 170° C. and pressures above 115 psig. do not appreciably effect the rate of reaction. Since it is more costly to use higher temperatures and pressures, the before recited temperatures are generally not exceeded.

In accordance with the above process, it has been found that substantially long oxidation times, greater than 30 hours and up to 50 hours, are needed to bring yields of tungsten values in the filtrate up to about 99 percent based on the tungsten present in the initial cemented tungsten carbide. It has been observed that long oxidation times result in the formation of an insoluble residue which is difficult to digest with the alkali metal hydroxide solution. It is believed that the undesirable portion of the residue which is difficult to digest is a complex cobalt tungstate.

The present invention provides for high yields while permitting shorter oxidation times which decreases the presence of difficult to digest tungstates. In accordance with the principles of the present invention, the resulting insoluble portion formed according to the above process are mixed with an alkali metal carbonate, and roasted in an atmosphere containing oxygen below the fusion temperature of the mixture so as to oxidize the mixture. The resulting oxidized product is leached with water so that substantially all the tungsten values initially present are recovered by the process.

The starting cemented tungsten carbide is oxidized in an oxygen containing gas for a period of time substantially less than needed to convert all of the metal values present to an oxidized product. It has been found that oxidation times of less than 10 and generally less than 5 hours are sufficient to oxidize about 95 percent of the tungsten carbide originally present. Greater times are generally not economical unless unusually large pieces of cemented tungsten carbide scrap are used since it is difficult to dissolve metal oxides formed by the longer oxidation times. Furthermore, longer oxidation times are uneconomical in view of the energy required to obtain a higher yield. It has been found that oxidation times on the order of 24 hours are needed to increase the efficiency of recovered tungsten values to approximately 96 percent and times on the order of 50 hours are needed to increase the efficiency of recovery to about 99 percent.

The insoluble sludge is preferably dried and crushed prior to blending with the alkali metal carbonate so that an intimate mixture is obtained which aids oxidation of the mixture in a minimal time. Preferably about 0.5 to about 1.5 parts of alkali metal carbonate are used per part of insoluble material. It has been found that lesser quantities may be used with a resulting decrease in subsequent tungsten recovery. It has been found that the use of increased amounts tend to promote the sintering and formation of a hard material which is difficult to leach. Preferably the mixture of alkali metal carbonate and insoluble material are roasted in a gas containing oxygen at temperature less than about 650° C. It has been found that when sodium carbonate is employed as the alkali metal carbonate, increased fusion of the mixture resulted at temperatures above about 650° C.

It has also been found that it is desirable that the sludge comprises less than about 35 percent by weight tungsten carbide. It is believed that when sludges contain more than this amount, there is not enough material present to prevent sintering and fusion by an exothermic reaction.

It may be desirable to remove cobalt values from the sludge by leaching the sludge with acid such as hydrochloric acid prior to roasting with carbonate. In the following examples parts are by weight unless otherwise indicated.

EXAMPLE I

About 100 parts of a cemented tungsten carbide containing about 6 percent cobalt is fired in air for about 2 hours at 825° C. The hard carbide fired obtains a flower-like appearance which is crushed into a powder. The powder is charged into a pressure reactor containing an aqueous solution of about 30 percent sodium hydroxide at about 20° C. The temperature is increased until the pressure is about 115 pounds per square inch. After maintaining the temperature and pressure for about 7 hours, the material is cooled and filtered. The filtrate is analyzed and determined to contain about 95 percent of the total tungsten. The residual sludge or insoluble portion which is separated from the filtrate is leached with hydrochloric acid, washed, air dried, pulverized and analyzed as having the following elemental composition: W 17.9%; Co 5.5%; Ta 7.9%; Ti 8.3%. About 100 parts of dried pulverized sludge is blended with about 50 parts of sodium carbonate and roasted in air at 650° C. furnace temperature for one hour. After cooling, the oxidized blended mixture is leached with 150 parts of water at room temperature for about 15 minutes, filtered and then washed with water. The filtrate contains greater than 98 percent of the tungsten original present in the starting residual sludge or insoluble portion. The residue separated from the filtrate was about 75 parts based on the 100 parts of starting insoluble portion and was analyzed as follows: W less than 0.5%, Co 7.3%, Ta 10.8%, Ti 10.5%. Less than 2 percent of the tungsten present in the starting insoluble portion was present in the final residue.

EXAMPLE II

The later part of Example II relating to the roasting of the pulverized residual sludge or insoluble portion with sodium carbonate was performed as discussed, except the time of roasting was varied with the following results reported in Table I.

TABLE I

| Time at 650° C. (hrs) | Percent of Original W in leach solution |
|---|---|
| 0.25 | 42 |
| 0.5 | 78 |
| 1.0 | >98 |

EXAMPLE III

The procedure according to Example I relating to the roasting of the sludge with sodium carbonate was performed except that various amounts of sodium carbonate were added to the dry sludge. In the case where 0% sodium carbonate was used in the roasting process, a 100 part alkali equivalent to sodium carbonate was added to the leach solution. In the other cases water was used as the leach solution. The results are reported as follows in Table II.

TABLE II

| Wt. of $Na_2Co_3$ Used per 100 Parts of Dry Sludge | % of Original W in Leach Solution |
|---|---|
| 0 | 3.3 |
| 50 | >98 |

TABLE II-continued

| Wt. of Na₂Co₃ Used per 100 Parts of Dry Sludge | % of Original W in Leach Solution |
|---|---|
| 100 | 93 |

EXAMPLE IV

Using the procedure set forth in Example I relating to the roasting the sludge with sodium carbonate, the temperature of the furnace was increased. With increasing temperatures above 650° C., it was observed that an exothermic reaction apparently took place. The reactants appeared to reach the melting point of sodium tungstate due to the oxidation of the tungsten carbide and the heat of reaction of the sodium carbonate and tungstate.

EXAMPLE V

Using the same procedure as followed in Example I relating to the roasting of the sludge with sodium carbonate, the sludge was enriched with tungsten carbide. It was found that an increasing amount of sintering and finally fusion occurred at tungsten oxide concentrations of 35 percent. It appears that at this point there is not enough inert material to prevent sintering and fusion.

While there have been shown and described what are considered the preferred embodiments of this invention, it will be obvious to those skilled in the art that various changes and modifications may be made therein without departing of the scope of the invention as defined in the appended claims.

We claim:

1. In a process for recovering tungsten from cemented tungsten carbide wherein the cemented tungsten carbide is oxidized by heating in air at a temperature of from about 800° C. to about 900° C. for a time sufficient to form an oxidized product and the oxidized product is digested in an aqueous solution of sodium hydroxide at a temperature greater than about 140° C. and under a pressure greater than about 50 pounds per square inch to form a soluble portion and an insoluble portion, the improvement comprising oxidizing said tungsten carbide by heating in an oxygen containing atmosphere for a period less than about ten hours, mixing the insoluble portion with from about 50 to about 150 parts of sodium carbonate per 100 parts of insoluble portion to form a resulting mixture, roasting the resulting mixture at a temperature below the fusion point of the mixture in an atmosphere containing oxygen to oxidize the insoluble portion and form another product and leaching the other product with water to recover soluble tungsten values.

2. A process according to claim 1 wherein the oxidized product is crushed to form a powder prior to digesting.

3. A process according to claim 1 wherein said digestion comprises contacting said oxidized product with an aqueous alkali metal hydroxide solution at a temperature from at about 140° C. to 195° C. and under pressure of from about 50 to 200 pounds per square inch for about 6 to 10 hours.

4. A process according to claim 1 wherein said insoluble portion is dried and intimately mixed with sodium carbonate prior to roasting.

5. A process according to claim 4 wherein the concentration of tungsten in the insoluble portion is less than about 35 percent by weight.

* * * * *